United States Patent [19]
Jahn et al.

[11] Patent Number: 5,396,552
[45] Date of Patent: Mar. 7, 1995

[54] DIGITAL COMMUNICATION SYSTEM WITH TRANSMISSION SERVERS

[75] Inventors: Alfred Jahn, Munich; Teodor Kremer, Zürich; Günther Weisigk, Birmensdorf-Zürich; Eugen Rippenstein, Aosch, all of Germany

[73] Assignee: Siemens Aktiengesellschaft, Munich, Germany

[21] Appl. No.: 117,086
[22] PCT Filed: Feb. 27, 1992
[86] PCT No.: PCT/EP92/00418
  § 371 Date: Sep. 9, 1993
  § 102(e) Date: Sep. 9, 1993
[87] PCT Pub. No.: WO92/17013
  PCT Pub. Date: Oct. 1, 1992

[30] Foreign Application Priority Data
Mar. 12, 1991 [DE] Germany .................. 41 07 897.7

[51] Int. Cl.⁶ ............................................ H04M 7/00
[52] U.S. Cl. .................................... 379/396; 379/387; 379/94; 370/58.1; 370/95.1; 370/68.1
[58] Field of Search ....................... 379/396, 387, 94; 370/58.1, 95.1, 68.1; 395/325; 364/222.2

[56] References Cited
PUBLICATIONS

"Private ESDN Communications Systems and their Interoperation with the Public ISDN", Günter Raab, Telcom Report, Integrated Services Digital Network, No. 8, (1985) pp. 57-63.

Primary Examiner—James L. Dwyer
Assistant Examiner—Jacques M. Saint-Surin
Attorney, Agent, or Firm—Hill, Steadman & Simpson

[57] ABSTRACT

Digital communication systems cover a wide range of applications with the provision of features. However, new features must be added for specific application areas. One such specific application area is trading with shares, currency, raw materials, etc.

13 Claims, 1 Drawing Sheet

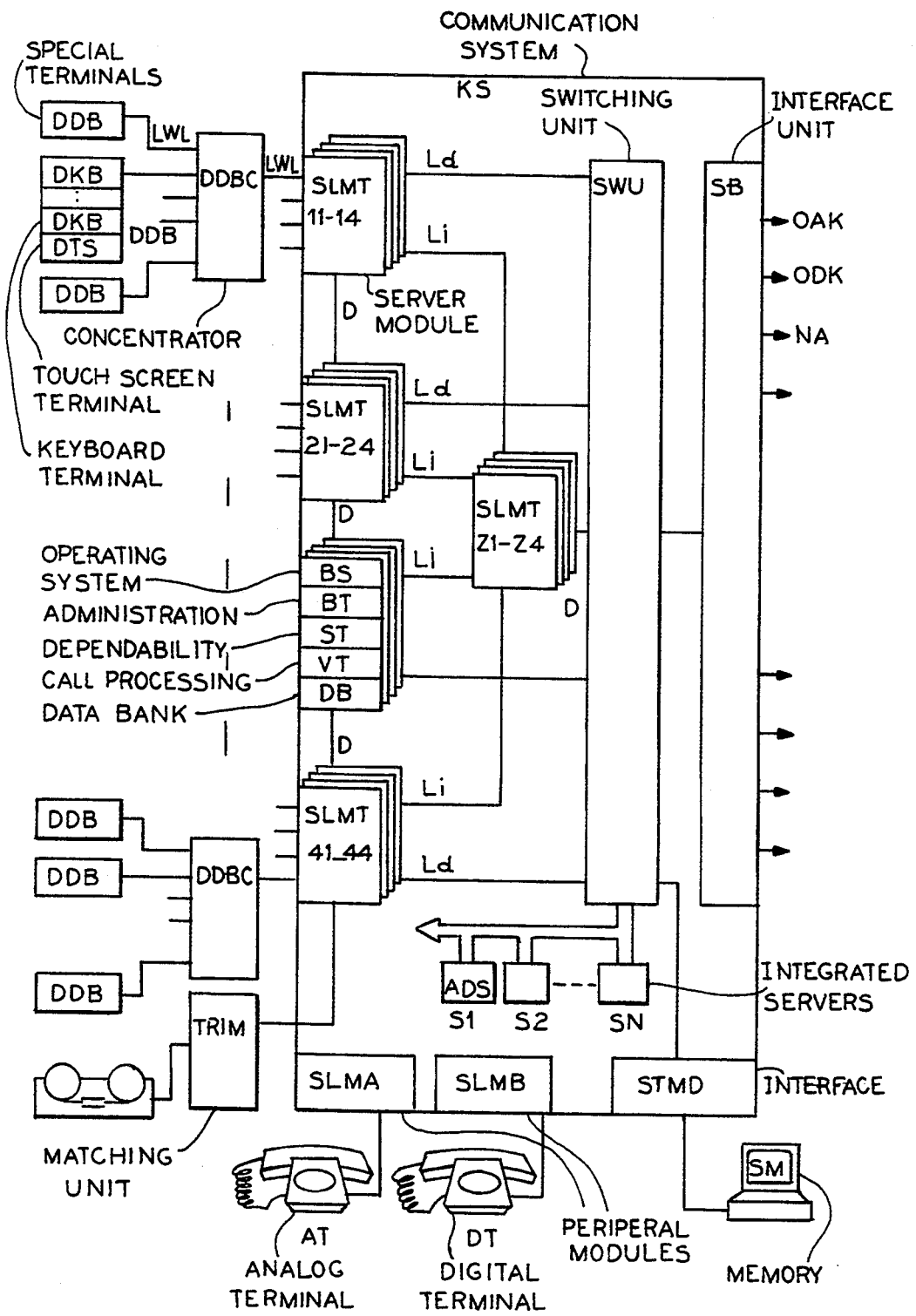

5,396,552

DIGITAL COMMUNICATION SYSTEM WITH TRANSMISSION SERVERS

BACKGROUND OF THE INVENTION

The present invention relates to a communication system.

Communication networks with communication systems at their nodes exist for the "voice" communication service. Their task is to establish connections between the subscribers connected to the communication systems. It is possible to draw a distinction here between public communication networks and so-called local area networks which are primarily installed within companies. Up to several thousand subscribers can be connected to the communication systems situated in the nodes of the local area networks, which are often referred to as private branch exchanges. An interface to the public communication networks also permits communication with external partners.

As long as communication is oriented to the "voice" form of communication, analog communication networks and communication systems are adequate for the associated basic functions. Modern office communication, however, encompasses further forms of communication which cannot be realized, or realized only inadequately, with such analog systems. These are the "image", "data" and "text" forms of communication for which digital methods are used for transmission and processing. In practice, therefore, from time to time digital communication networks have resulted that were set up parallel to the hitherto existing analog communication networks. Of necessity, this entails a certain complexity and degree of confusion as far as communication with other subscribers is concerned, since in general different subscriber numbers for the different communication services are assigned to a subscriber. This was one of the reasons for integrating the parallel networks in a uniform communication network.

The ideas surrounding this concept are associated with the term ISDN (Integrated Services Digital Network). In public communication networks the realization of these concepts is still in a period of transition, while the integration of the services in the office has already progressed further. These types of digital communication systems which permit flexible adaptation to modern forms of organization are known from the publication "ISDN im Büro" (ISDN in the office), published in December 1985 as a special issue together with the monthly publications 'Telcom Report' and Siemens magazine "COM" from the Siemens company. This is accomplished, inter alia, by integration of so-called servers, that is to say hardware modules, which provide special services - features in the communication system - by means of system procedures. Said servers are used for the transmission of image data, text data, etc.

In certain application areas for office communication, special features that are not generally common are required; one such application area is for instance international trading with shares, currency, raw materials, which requires not only worldwide communication for decision-making but also direct, active intervention in the market. Special systems for such purposes are currently connected as independent systems or as secondary private branch exchanges under an analog main system.

The digital communication systems discussed in the abovementioned publication are therefore not designed specifically for such applications; thus, for instance, for an exchange dealer who needs to react to a changing market situation in seconds, not only constant monitoring of the market, but also active intervention in the market is vital. Appropriate features for this are provided by known digital communication systems only to a limited extent, and by known analog communication systems only with a relatively high outlay, for example by means of a secondary private branch exchange in addition to the analog main system.

That any member of an exchange dealing team can be reached quickly, to process a standard job for example, is often of particular importance, as is the capability of setting up conference calls.

An ISDN communication system is furthermore known from Telecom Report, "Integrated Services Digital Network", Volume 8, 1985, Günter Raab: "Private ISDN Communication Systems and Interoperation with the Public ISDN" and from German reference 3,625,857. Several services can be combined under one telephone number with communication systems designed in such a way. Such communication systems are not, however, designed for special applications.

SUMMARY OF THE INVENTION

The object of the invention is to make office communication possible on a digital basis with the provision of features appropriate to specific applications, such as brokerage systems for example.

The object of the present invention is achieved by a communication system having a switching unit which serves to switch through connection lines and which has a switching network and a central controller, having at least one centralized server providing data and programs for features, and having peripheral modules acting as interfaces to subscribe terminals. Special terminals with actuating means, optical display means, at least one loudspeaker and at least one handset are connected to special peripheral modules that are connected to the switching unit. The special peripheral modules are linked to each other via data paths, and are incorporated in a system-compliant manner in the communication system as an integral component of the communication system by means of control procedures, call processing procedures and data bank procedures.

Advantageous developments of the present invention are as follows.

The control procedures perform the control of the actuating means and optical display means. These control procedures transmit data in a transmission procedure from the special terminals as well as the special peripheral modules to an external storage medium via an interface element.

Call processing procedures convert the transmission formats of special information data of the special terminals into communication-system specific formats. These procedures also provide basic switching functions as the foundations for further features.

Data bank procedures notify all special peripheral modules of information about the special terminals and the special peripheral modules and utilization of the data paths.

The special terminals are connected to the special peripheral modules via concentrator modules.

The special terminals are equipped with sending and receiving devices for a plurality of information channels. An assignment between an information channel and an acoustic element can be controlled by means of key actuation.

Further subscriber terminals are connected through to at least one of the special peripheral modules for the purpose of a passive monitoring.

A further external storage medium serving to record calls can be connected to at least one of the special peripheral modules via a matching unit.

The special peripheral modules are attached to the switching unit via at least one additional central peripheral server module.

The special peripheral modules are divided into system groups, the special peripheral module groups being connected to one another via data paths.

Special terminals connected simultaneously to the special peripheral modules can be dialed via at least one central peripheral server module.

Conference modules are provided in the special peripheral modules in such a way that it is possible to respond to a call via at least two of the dialed special terminals.

Individual special terminals or special terminals combined in groups are configured for speech monitoring of a line, which can be seized by authorized subscribers to output an announcement and which is released immediately for output of the announcement after the respective telephone number has been dialed.

The introduction of switching servers into the peripherals of a digital communication system is to be considered essential to the invention. They are realized as special peripheral modules - termed server modules in the text below - and are connected to the communication system instead of one or more conventional digital interface modules. This makes the full range of features of the digital communication system together with the additional features of the switching server available to the user. In particular, the displacement of the switching server out to the peripherals of the communication system offers considerable advantages, such as, for example, the ability to provide new features flexibly when required without having to intervene extensively in central parts of the communication system and possibly having to switch off the whole system as a result. Moreover, the use of switching servers instead of other interface modules results in a drastic reduction in the amount of cabling required and hence minimizes error probability.

As a result of a special networking of the switching servers present, it therefore becomes possible for an external caller to call several members of the dealing team at the same time ('parallel call' feature). This results in a minimum waiting time for the caller before one of the team members responds to the call. If, for example, five members of the dealing team are processing commodity futures transactions and a customer wishes to place an order relating to these as quickly as possible, he can dial the number assigned to the five team members and will be connected to the first member who responds to the call. Furthermore, it is also possible to provide that not Just one, but several team members can take part in a conference call with the caller. The functionally identical switching servers, which each have at least one switching unit, can be connected to one another directly or via an additional central switching server in order to realize this feature. The use of a central switching server here has the advantage that the capacity of the switching units used in the switching forum can be kept relatively small.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

The single Figure shows a communication system KS with a modular structure, to which conventional terminals DT, AT, as well as special terminals DDB (DIGITAL DEALER BOARD) via concentrator modules DDBC, are connected, and which is connected to further communication systems OAK, ODK, NA starting from an interface module SB.

DESCRIPTION OF THE PREFERRED EMBODIMENT

The central component of the communication system KS is a switching unit SWU as depicted in the single Figure. All the central units serving to switch through connections and also a central controller required for this purpose are integrated therein. The switching unit SWU is furthermore connected to interface units SB, to peripheral modules SLMB and SLMA, an interface element STMD, and also a matching unit TRIM. On the output side the interface units SB establish the connection to other private branch exchanges and also to external communication systems. The latter may be, for example, public digital or analog communication systems OAK, ODK. The communication system KS and said public communication systems OAK, ODK can be connected here via dedicated lines or leased lines. The communication system KS is incorporated in public communication networks in compliance with the ISDN system; the interface-units SB must ensure said incorporation by the provision of special data formats. Furthermore, the switching unit SWU is connected to integrated. servers S1 . . . SN via central bus systems. Additionally connected to the switching unit SWU are the peripheral modules SLMA and SLMB, whose task is to provide for subscriber terminals the BORSCHT functions which are generally known in switching technology. While the SLMA peripheral modules enable analog subscriber terminals AT to be connected, the peripheral modules SLMB are designed for the connection of digital subscriber terminals DT. The interface unit STMD performs matching measures between the communication system KS and external memory units SM.

The switching servers are realized as special peripheral modules SLMT, referred to as server modules in the text below. They are incorporated decentrally in the communication system KS, in that they are inserted instead of peripheral modules SLMB. The system-compliant incorporation requires extensive matching measures at the respective hardware and software interfaces, which will be discussed further below.

Given a high configuration level of the dealer system, the switching servers SLMT are preferably arranged in system groups SLMT11, . . . SLMT44; SLMTZ1 . . . SLMTZ4. A central system group with four switching servers is preferably assigned here to four individual system groups each with 4 switching servers.

In a first configuration phase, for smaller dealing teams, only a single system group with four server modules SLMT11 ... SLMT14 is used, the latter being connected to one another via data paths D and/or a central peripheral server module SLMTZ1. Further system groups each with four server modules SLMT21 ... SLMT24; SLMT31 ... SLMT34; SLMT41 ... SLMT44 can be added in the next configuration levels. According to the invention four individual system groups can be linked to each other directly via additional data paths and/or via an additional, decentralized system group with peripheral server modules SLMTZ1 ... SLMTZ4. Each of the four individual system groups is connected here to one of the peripheral server modules SLMTZ1 ... SLMTZ4 of the central system group, which are connected to one another via data paths D, via lines Li. The maximum number of server modules SLMT per individual system group is determined here by the capacity of the switching units SWU used on the server modules. For example, up to 59 lines (and one HDLC signaling line) can be connected from each system group to the central system group. A system group thus has access to 59 shared lines. The central system group therefore has over 240 terminal connections available, four of which are provided for the HDLC signaling of the individual system groups. The remaining 236 terminal connections can be used freely here for connections to the individual system groups or for shared lines.

On the output side, the special terminals DDB are connected to the server modules SLMT11 ... SLMT44 via concentrator modules DDBC. For this purpose the concentrator modules DDBC were equipped with multiplexing capabilities in order to switch the data arriving from a plurality of subscriber terminals DDB onto a connection line to one of the server modules SLMT11 ... SLMT44. The subscriber terminals DDB are connected to the concentrator modules DDBC and also to the server modules SLMT via optical waveguides LWL. A PCM (pulse code modulation) method is used as the transmission method. As can be seen from the single FIG. 1, different special terminals DDB can be used, depending on the dealer workstation in each case. Special terminals DDB may be, for example, subscriber terminals DKB (DEALER KEY BOARD) or DTS (DEALER TOUCH SCREEN). The subscriber terminal DKB is a key-oriented terminal designed for the dealer workstation. It is equipped with optical display elements, at least one handset and also a multiplicity of keys to which fixed and freely programmable functions can be assigned on several levels.

The subscriber terminal DTS is a screen-oriented terminal at the dealer workstation in which, in addition to a handset, in particular a graphics-capable screen and also a corresponding touch medium are integrated. The elements of the subscriber terminal DKB and DTS are addressed via the server module SLMT using control procedures BS, BT.

In general, the procedures running on the server module SLMT are stored organizationally in corresponding complexes on the server module SLMT. All the software of the switching server SLMT distinguishes here procedures
of the operating system BS
of administration and maintenance BT
of call processing VT
of the dependability system ST, and also
of the data bank DB.

While the procedures of the operating system BS perform control tasks, the procedures of administration and maintenance BT process control tasks in the area
of time synchronization with the communication system KS, and also
of system reliability.

The fault-free operation of each server module SLMT is ensured by the dependability system ST. In particular it ensures that any errors occurring are analyzed immediately and that corresponding reactions of the system are triggered if necessary.

The procedures of the call processing function block VT of the server module SLMT process the actual typical dealer features. Typical dealer features are, for example:
speech monitoring
brokerage and parallel call functions
conference call functions
listening and writing functions, which will be discussed in greater detail elsewhere. In particular, the procedures of the call processing function block VT of the server module SLMT perform the conversion of the data formats arriving from the special terminals DDB into the data formats of the communication system KS.

In addition, a data bank DB is stored on the server module SLMT, in which static and dynamic configuration data of the special terminals DDB and of the server modules SLMT themselves are maintained. The static configuration data provide information about the equipping of the subscriber terminals DDB with handsets and loudspeakers, while the dynamic configuration data provide information about the current seizure states of the handsets as well as the seizure states of the lines connected. The data banks DB stored on each server module SLMT are updated with the latest configuration data via the data paths D. Thus, each server module SLMT has a complete map of the entire configuration of all the switching servers. Any change in the configuration state of one of the server modules SLMT or of the special terminal DDB is immediately notified to the other server modules SLMT via the data paths D. Associated with this concept is a decentralization of static and dynamic configuration data. This means that, for example when new features are set up, any changes can be made on the server modules SLMT without a large outlay and without thereby having to intervene centrally in the procedures of the communication system KS.

Furthermore, external memory units - termed system managers SM in the text below - with video display unit are connected to the communication system KS via the interface elements STMD. In addition a power supply that is independent of the communication system KS is integrated in the system manager SM; in general the system manager SM contains the configuration data for the server modules SLMT and the subscriber terminals DDB. The displacement of the configuration data to external units is particularly significant whenever the communication system has to be switched off for maintenance work. In this case, when the communication system KS is 'powered up', the server modules SLMT and also the subscriber terminals DDB are loaded with said configuration data from the system manager SM, whereupon the original state is restored in a very short time.

This concept results in features which take account of the special requirements of a dealer work-station. In particular the 'SPEECH MONITORING' feature, with which several calls can be connected through to one loudspeaker, takes account of the special conditions of the dealer workstation.

However, the "speech monitoring" feature can also be provided in such a way that a terminal or a group of terminals linked, for example, via a conference module does not monitor a line for a two-way conversation, but rather for an announcement. That is to say, subscribers connected to the exchange who are authorized to cut into the corresponding announcement lines can output announcements to one or more groups. At least one announcement line can be specially configured on the special terminals DDB and can be dialed by pressing a button for example. In this case it is provided that the dialed announcement line, to which a telephone number is assigned, switches over immediately to the call state. The announcement line is configured on further special units DDB in such a way, for example, that announcements are automatically output over the loudspeaker connected to the special terminal DDB. As a result, messages and important information can be output to various target groups from a central point.

Thus, for example, four calls from different stock exchanges can be connected through to a loudspeaker of one of the special terminals DDB; people working at such workstations are usually able to "pick out" the information relevant to them.

It is often the case that intervention in the market needs to be made in seconds. Lengthy dialing operations to establish worldwide connections must therefore be avoided at all costs. For this purpose, therefore, connections can be established to destinations by pressing a button on the subscriber terminal DDB; in addition directions can be specified by pressing a button, then the appropriate destination can be reached by dialing a suffix. Efficient telephoning is also served by the 'CALL HOLD' feature, which permits existing connections, for example to several international stock exchanges, to be placed on 'HOLD' at the dealer workstation. The dealer is therefore 'potentially' connected to a multiplicity of partners at his workstation. In reality, he might have activated one, two or more connection(s), depending on how many handsets are provided per unit, and also be commnunicating actively with the respective partners. It is however possible at any time to switch an active call into the 'HOLD' state and to cut into a call that is currently on 'HOLD' and communicate actively with that partner. These switchover operations are controlled from the special terminal DDB by pressing the appropriate buttons or touching the corresponding field on the screen. The procedures that execute the control operations are performed by the procedure complexes of call processing VT of the server module SLMT.

Legally, this selling/buying of products represents a contract between two partners, in general between client and dealer. In principle, an exchange dealer who daily makes decisions about buying/selling large amounts is constantly concluding contracts with different partners over the telephone without it being possible to follow up the particulars of the contracts concluded. Such a capability is afforded by the 'listening/writing' features. Given the design of the switching servers provided for in the invention, it can be provided that further subscribers are switched onto the relevant lines to listen into calls. This takes place on one of the server modules SLMT. Depending on the static and dynamic configuration data stored in the data bank procedures DB, the procedures of call processing VT switch through the corresponding "speech highways" of the switching unit SWU to the server module SLMT to be used for 'listening purposes'. In order, moreover, to be able to follow up later the particulars of the contracts which have been concluded only verbally up to this point, a tape unit is additionally attached to the server module SLMT. The connection is made here via a matching unit TRIM, which in turn is connected to the server module SLMT and performs the required matching measure.

Naturally it is not only the ability of the dealing team to make contact rapidly with the outside, that is to say the quick call to an external stock exchange, but also in particular the ability of clients to make rapid contact with members of the dealing team that is important. Lost time resulting from multiple calling of various team members who are currently absent is to be avoided thereby. For this reason, it is possible for the client to dial one number with which he can simultaneously call several members or a sub-group of the dealing team. If this sub-group always contains a favorably selected minimum number of members that are present, the client will always be able to contact the dealing team very quickly in each case. It may also be necessary for various team members to be able to take part in a conference call with the client.

The switching through of a client call, which is conducted to the server module SLMT11 for example, to several team members of different further system groups can be performed here (without the assistance of a central system group) by the switching unit SWU of the server module SLMT11 via direct data lines to the respective system groups. It is readily evident, however, that the demands on the capacity of the switching unit SWU of each server module SLMT and the number of connections to be provided increases greatly in line with the increasing number of additional system groups. A central system group with the peripheral server modules SLMTZ1 . . . SLMTZ4 is therefore advantageously used. It is then provided by means of call processing procedures that a shared connection to a plurality of system groups is set up for an external call conducted to one of the central system groups. At the same time, signaling takes place on all the relevant system groups. The speech monitoring, the entry of further subscribers of the same system group into connected-through lines and the switching of lines is preferably performed at the individual system group. A shared line can be switched from the central system group to various individual system groups. The shared connections set up by the central system group are preferably to be concentrated on a single server module SLMT in the individual system groups. Each of the individual system groups receives an HDLC signaling path to the central system group from the SLMT. The signaling can be performed here via the signaling path from or to the central system group depending on the location of the caller. The acoustic interconnection of a plurality of system groups in the central system group or individual call subscribers of an individual system group is performed here in conference modules provided in the server modules SLMT.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication system having a switching unit which serves to switch through connection lines and has a switching network and a central controller, having at least one centralized server providing data and programs for features, and also having peripheral modules acting as interfaces to subscriber terminals, comprising: special terminals with actuating means, optical display means, at least one loudspeaker and at least one handset connected to special peripheral modules, which are connected to the switching unit, said special peripheral modules linked to each other via data paths, and said special peripheral modules being incorporated in the communication system as an integral component of the communication system by means of control procedures, call processing procedures and data bank procedures.

2. The communication system as claimed in claim 1, wherein the control procedures control the actuating means and optical display means, and transmit data in a transmission procedure from the special terminals as well as the special peripheral modules to an external storage medium via an interface element.

3. The communication system as claimed in claim 1, wherein the call processing procedures convert transmission formats of special information data of the special terminals into communication-system specific formats, and in addition provide basic switching functions as foundations for further features.

4. The communication system as claimed in claim 1, wherein the data bank procedures notify all special peripheral modules of information about the special terminals and the special peripheral modules and utilization of the data paths.

5. The communication system as claimed in claim 1, wherein the special terminals are connected to the special peripheral modules via concentrator modules.

6. The communication system as claimed in claim 1, wherein the special terminals are equipped with sending and receiving devices for a plurality of information channels, and an assignment between an information channel and an acoustic element is controllable by means of key actuation.

7. The communication system as claimed in claim 1, wherein further subscriber terminals are connected through to at least one of the special peripheral modules for passive monitoring.

8. The communication system as claimed in claim 1, wherein external storage medium for recording calls is connectable to at least one of the special peripheral modules via a matching unit.

9. The communication system as claimed in claim 1, wherein the special peripheral modules are connected to the switching unit via at least one additional central peripheral server module.

10. The communication system as claimed in claim 1, wherein the special peripheral modules are divided into system groups the special peripheral modules being connected to one another via data paths.

11. The communication system as claimed in claim 1, wherein special terminals connected simultaneously to the special peripheral modules are dialable via at least one central peripheral server module.

12. The communication system as claimed in claim 1, wherein conference modules are provided in the special peripheral modules such that a call is respondable to via at least two of the dialed special terminals.

13. The communication system as claimed in claim 1, wherein individual special terminals or special terminals combined in groups are configured for speech monitoring of a line, which line is seizable by authorized subscribers to output an announcement and immediately releasable for output of the announcement after a respective telephone number has been dialed.

* * * * *